S. H. BRUBAKER, DEC'D.
C. H. BRUBAKER, ADMINISTRATRIX.
APPARATUS FOR TRANSPORTING PERISHABLE ARTICLES.
APPLICATION FILED OCT. 31, 1906. RENEWED APR. 4, 1914.
1,297,318.
Patented Mar. 18, 1919.
3 SHEETS—SHEET 2.
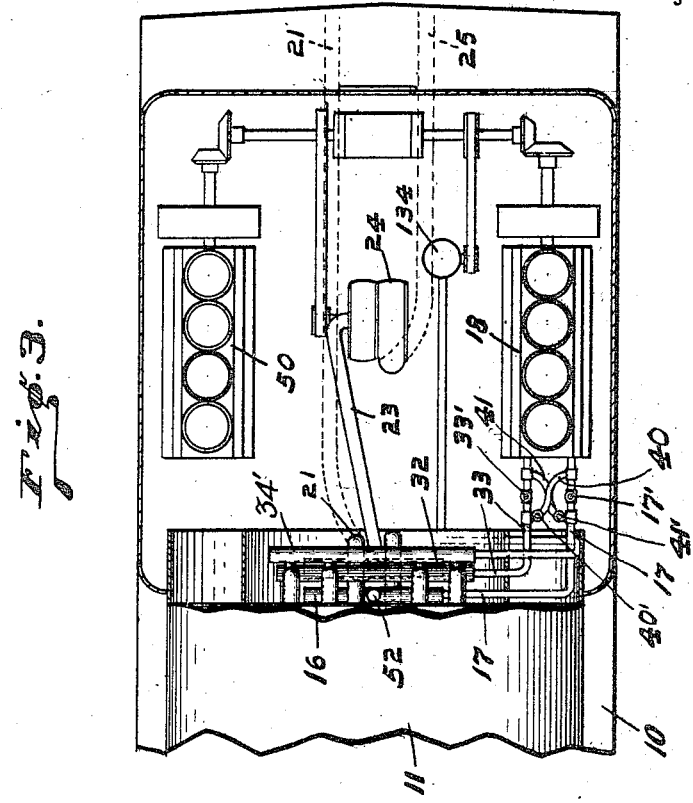
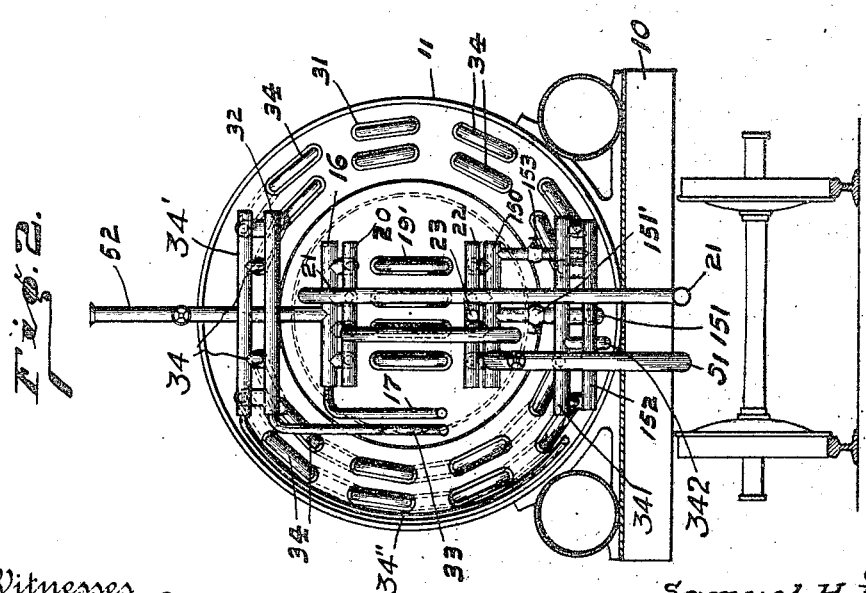
Witnesses
Frank A. Fahle
Thomas W. McMeans
Inventor
Samuel H. Brubaker
By Bradford Hood
Attorneys

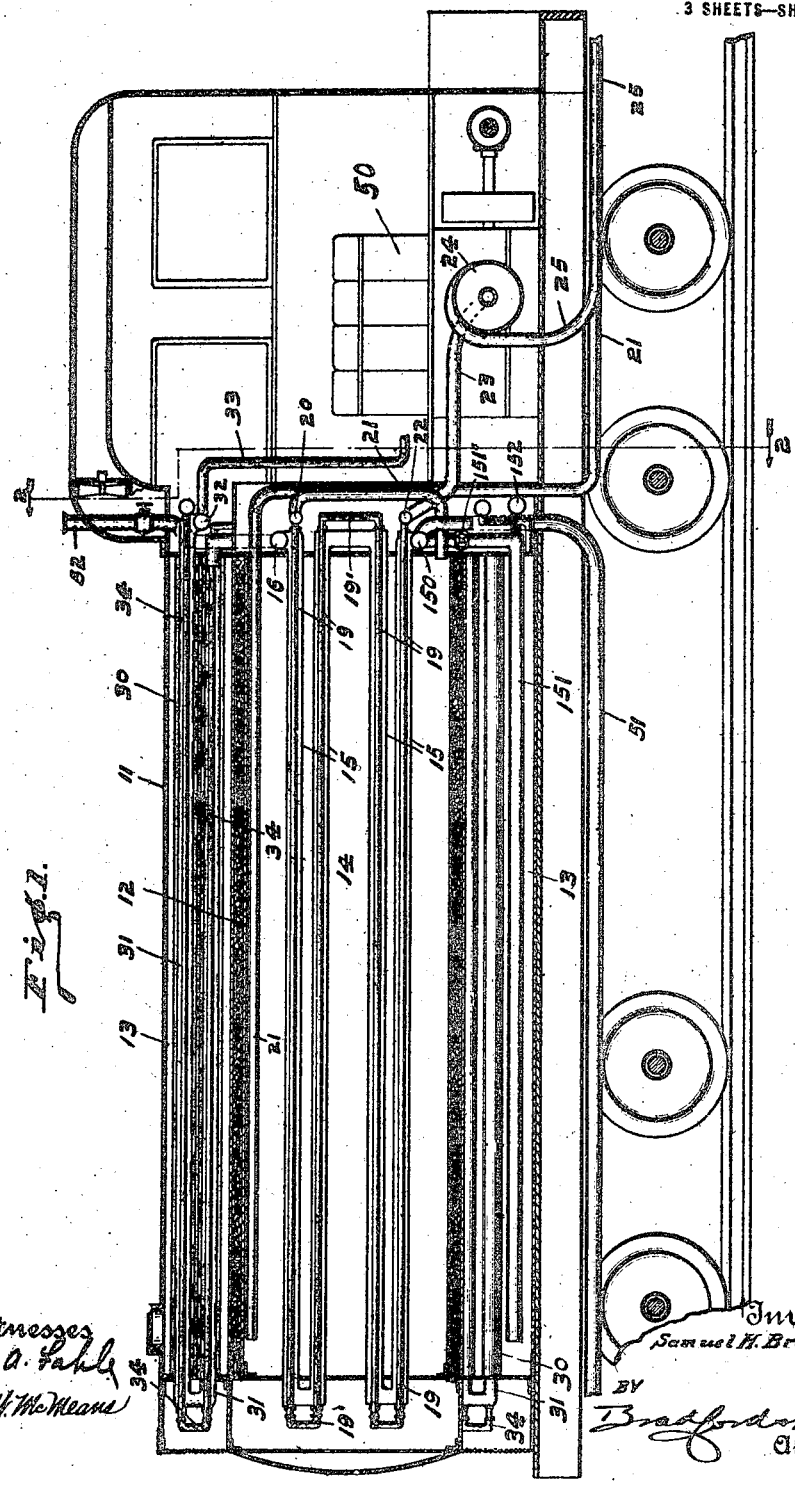

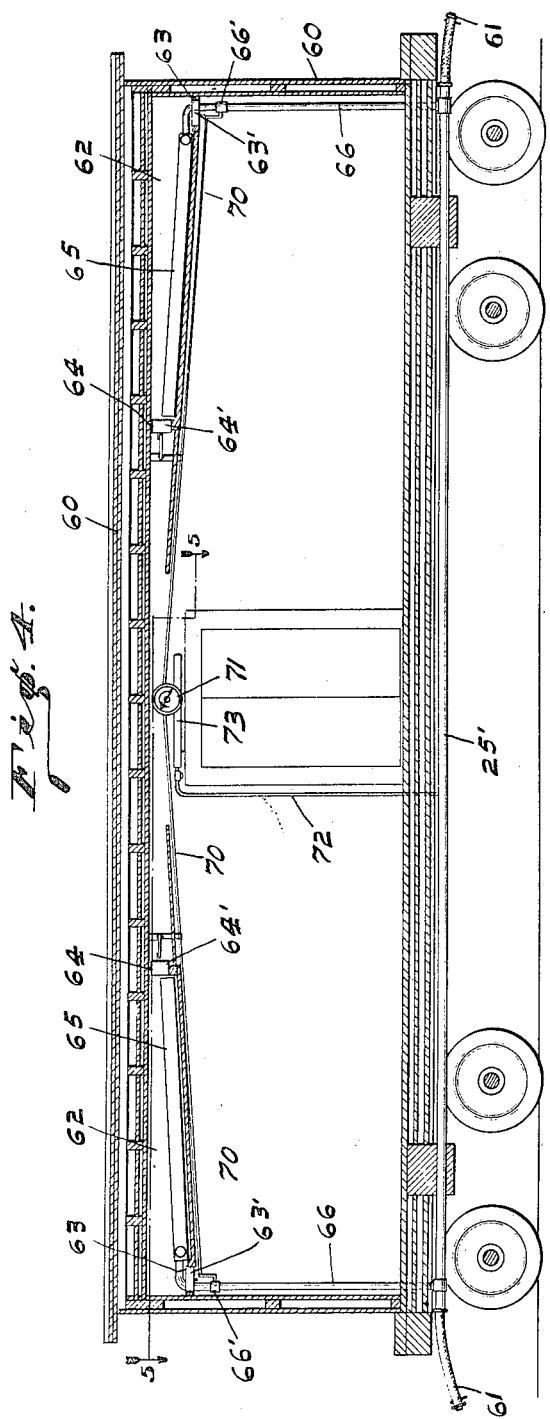
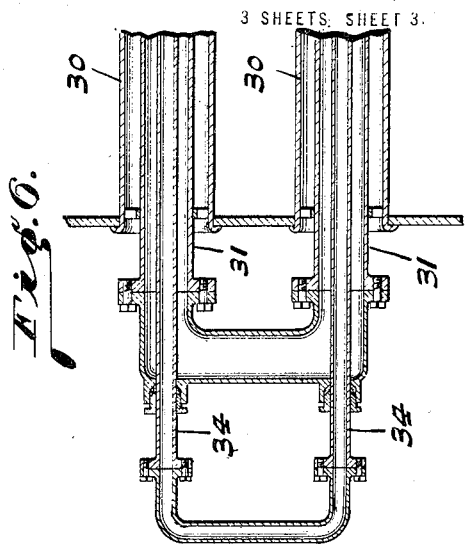
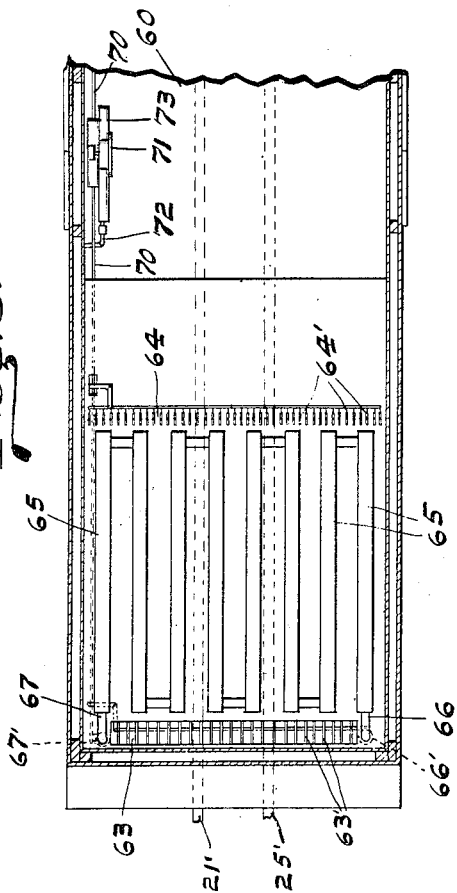

UNITED STATES PATENT OFFICE.

SAMUEL H. BRUBAKER, OF INDIANAPOLIS, INDIANA; CHARITY H. BRUBAKER, ADMINISTRATRIX OF SAID SAMUEL H. BRUBAKER, DECEASED, ASSIGNOR OF ONE-FOURTH TO JOHN V. DITTEMORE, OF INDIANAPOLIS, INDIANA.

APPARATUS FOR TRANSPORTING PERISHABLE ARTICLES.

1,297,318.     Specification of Letters Patent.     Patented Mar. 18, 1919.

Application filed October 31, 1906, Serial No. 341,456. Renewed April 4, 1914. Serial No. 829,709.

*To all whom it may concern:*

Be it known that I, SAMUEL H. BRUBAKER, a citizen of the United States, residing at Indianapolis, in the county of Marion and State of Indiana, have invented certain new and useful Improvements in Apparatus for Transporting Perishable Articles, of which the following is a specification.

In the transportation of perishable goods, such as fruits, meats and the like, over considerable distances, the climatic conditions vary considerably, and this is especially true of shipments of fruits from California to eastern and northern States in the winter time. With the present methods of refrigeration the amount of space required for ice chambers is a very considerable proportion of the total capacity of a car and the weight of the ice is a very considerable proportion of the load capacity of the car. When an ice car goes from a warm climate to a very cold climate the temperature within the car lowers sometimes to below freezing and a very considerable proportion of the material within the car is spoiled.

The object of my present invention is to provide a compact and practical portable refrigerating plant consisting primarily of a peculiarly arranged refrigerating car, preferably combined with the water-carrying tender of the locomotive, the construction being such that from this refrigerating car may be circulated either a refrigerating medium or a tempering medium to properly constructed refrigerating cars. A further object of my invention is to so construct the generator car that the same medium may be used either for refrigerating or tempering by a mere reversal of direction of circulation of the medium in the generator car. A further object of my invention is to produce a refrigerating car, to be used in connection with the generator car, of such construction that the temperature-modifying medium circulating therethrough may be retained therein and its effect upon the interior of the car automatically controlled in accordance with the needs.

The accompanying drawings illustrate my invention;

Figure 1 is a longitudinal section of my improved generator car; Fig. 2 a transverse section on line 2—2 of Fig. 1; Fig. 3 a plan thereof; Fig. 4 a longitudinal section of the refrigerator car; Fig. 5 a horizontal section on line 5—5 of Fig. 4, and Fig. 6 a detail.

In the drawings 10 indicates a suitable portable platform having a water tank 11 mounted thereon, and preferably cylindrical for the sake of strength. Mounted centrally within tank 11 is a cylindrical shell 12 filled with a packing, such as cork or other non-heat-conducting material, thus forming an annular water chamber 13, and an inner chamber 14.

Extending through chamber 14 are pipes 15 which are connected at alternate ends to form a coil or coils for the circulation of the medium by which the temperature of the circulating medium may be properly effected. The upper series of the pipes 15 are connected by a header 16 which communicates by pipe 17 with a compressor 18. The lower series of these pipes are connected by a header 150 which leads, through a reducing valve 151' from a header 152 connected with a reservoir 151 arranged in space 13. Mounted in each pipe 15 is a smaller pipe 19 and these pipes are connected at alternate ends by pipes 19' to form coils extending through the coils formed by the pipes 15. The pipes 19 of the upper series are connected by a header 20, which connects with the interior of chamber 14; the return pipe 21 also connecting with chamber 14. The lower series of pipes 19 are connected by header 22 which is connected by a pipe 23 with one side of a suitable circulating pump 24, which pump delivers to a feeder pipe 25.

Extending longitudinally through chamber 13 are pipes 30 which are open at their ends so as to permit the free circulation of air therethrough. Extending through pipes 30 are smaller pipes 31 which are connected at alternate ends to form a coil beginning at the top of chamber 13 and ending at the bottom. The upper series of pipes 31 are connected by a header 32 and this header is connected by a pipe 33 with the end of the compressor 18 opposite to that to which pipe 17 leads. The lower pipes 31 are connected to header 152. Running through each pipe 31 is a smaller pipe 34 which pipes are connected at alternate ends to form a circulating coil, one end of which is connected, through a header 341 and pipe 342 with the interior of chamber 13, and the other end of which leads, from a header 34' and pipe 34" to the feed water injector of the locomotive. A pump 134 is provided to positively circulate water through pipes 34. Pipe 17 is provided with a valve 17' and pipe 33 is provided with a valve 33'. Leading from pipe 33 at a point between the compressor and valve 33' is a pipe 40 which connects with pipe 17 beyond valve 17' and is provided with a valve 40'. Similarly the pipe 41 connects pipe 33 outside the valve 33' to pipe 17 between valve 17' and the compressor and this pipe is provided with valve 41'. By this arrangement the direction of circulation of the refrigerating medium from the compressor may be reversed. Header 150 may also be connected through valve 153 with header 152 to facilitate the reversed circulation, if deemed necessary header 152 is connected with the liquid refrigerant reservoir 151.

The compressor will be driven by any suitable motor 50. A steam pipe 51 connects with the lower series of pipes 15 and the valved escape pipe 52 communicates with the upper series of pipes 15. Pipes 21 and 25 are adapted to be connected with corresponding pipes 21' and 25' carried by the refrigerator cars 60 being coupled by suitable couplings 61 which preferably embody a valve which will be closed and opened automatically by the disconnection or connection of the couplings. As such valves are well known and commonly used in ordinary air-brake and steam connections, I deem it unnecessary to either illustrate or describe the same in detail.

Formed within the car 60, preferably at each end thereof near the top, is a chamber 62 which communicates at its opposite ends with the interior of the car through the valved openings 63 and 64 respectively. Said openings being closed or opened by suitable valves, as for instance, shutter valves 63' and 64', respectively, the arrangement being such that communication between the interior of the car and chamber 62 may be entirely stopped or may be adjusted as may be desired, by proper manipulation of the shutters 63' and 64'. Arranged within each chamber 62 is a coil 65 for the circulation of the temperature-affecting medium, said coil being connected at one end by a pipe 66 with delivery pipe 25' and by pipe 67 with the return pipe 21'. Suitable valves 66' and 67' are mounted respectively in the pipes 66 and 67, and these valves are adapted to be automatically operated by means of links 70 controlled in their operation by a thermostat 71. In the present case the thermostat serves to operate suitable valves which control the passage of air through a pipe 72 into a cylinder 73 having pistons connected to the links 70, the pipe 72 being connected to the air-brake system. Any other suitable means may be used for automatically opening and closing the valves. It is desirable that the shutters 63' and 64' be also automatically operated and they are therefore connected to the links 70, as shown, so that they will be closed at the same time that the valves are closed.

The operation is as follows: Chamber 13 will be filled with water, this chamber preferably being of sufficient capacity to supply the locomotive. The chamber 14 and pipes 19 will be filled with a suitable circulating medium, as for instance, brine or an aqueous solution of calcium chlorid, and the reservoir 151 will be filled, or partially filled, with a refrigerating medium, such for instance, as liquid carbon dioxid. Valves 17' and 33' will be opened and valves 40' and 41' closed. The circulating pump 24 will draw the calcium chlorid from the coil 19 and drive the same through pipe 25, returning through pipe 21 to chamber 14. The liquid carbon dioxid from the reservoir 151 will pass into the pipes 15, expanding therein through valve 151' and passing through said coil from bottom to top, passing out through pipe 17 to the compressor where it is compressed and delivered to pipes 31 in a heated condition. The hot gas envelops the condenser pipes 34 and thus readily parts with its surplus heat to the condenser water which is being circulated through the pipes 34 in the direction opposite to the direction of circulation of gases through pipes 31 so that it emerges from pipes 31 as a liquid and passes into the reservoir 151. As is usual, the temperature of the calcium chlorid issuing through pipe 23 may be controlled by the speed of circulation of the carbon dioxid. The passage of the carbon dioxid through pipes 15 operates to cool the calcium chlorid within the chamber 14 and further cool it as it passes from this chamber through the coil 19, while jacket 12 insulates the contents of chamber 14 from the contents of chamber 13. If tempering of the interior temperature of the cars is desired, it is merely necessary to close valves 17' and 33' and open valves 40' and 41', whereupon the direction of circulation of the carbon dioxid is reversed and the hot gases from the compressor come into association with the calcium chlorid in chamber 14 and pipes 19, thus making it possible to use the same medium for obtaining any desired temperature within the refrigerator car.

As the calcium chlorid circulates through the coils 65 with the shutters 63' and 64' open, a circulation of air within the car will be set up through chambers 62. Whenever the temperature within the car has lowered to the desired point the thermostat will cause the operation of links 70 to close, or partially close, the shutters 63' and 64', thus preventing free circulation of air through the chambers 62, and therefore eliminating for a time the effect of the medium within the coils 65. If now the car be cut out from the train there will remain within the coils 65 a sufficient quantity of calcium chlorid to affect properly the temperature of the interior of the car for a considerable period, and this amount is retained by the closing of the valves in the couplings 61 in the well known manner. The car is therefore capable of transportation over a considerable distance while still retaining a temperature-controlling medium in the chambers 62.

It will be noticed that the refrigerator car construction is such as to be very compact yet possessing considerable capacity.

It is not the intention for the apparatus to be used for long periods in the reversed or heating arrangement. There would of course be a tendency to freeze the water in tank 13 and such freezing might be accomplished if the operation were continued long enough, but if such an extended use were necessary it is entirely feasible to stop the train at some water tank along the road, drain the tank 13 before the water has frozen and refill the tank 13 with warmer water. It will, of course, be understood that if the water in the ordinary water tanks along the road is not sufficiently warm, a supply may be obtained from other sources and the water may be heated from the motor 50 or by the heat generating in the closed compartment at the end of the tank of the generator car.

I claim as my invention:

1. In a portable refrigerator plant, a car comprising a container for a circulating temperature-affecting medium, a condenser, means for circulating a temperature-changing medium in either direction through the condenser and circulating medium.

2. In a portable refrigerating plant, a car carrying a water tank, a condenser coil arranged therein, a chamber formed in said tank for containing a circulating medium, a coil arranged in said chamber, means for circulating a temperature-changing medium through said coils in either direction, and means for circulating the circulating medium through one or more cars.

3. In a portable refrigerating plant, the combination with a vehicle, of a substantially cylindrical horizontal tank mounted thereon, an internal horizontal shell mounted therein and consisting in part of heat-insulating material to form an interior chamber and a surrounding annular chamber, circulating coils mounted in each of said chambers, and piping for withdrawing liquid from and returning liquid to said internal shell.

4. In a portable refrigerating plant, the combination with a vehicle, of a substantially cylindrical tank mounted thereon, an internal shell mounted therein to form an interior chamber and a surrounding annular chamber, two circulating coils mounted in each of said chambers, a compressor, intermediate connections between said compressor and one coil of each set, and means for causing a circulation through each of the other two coils.

5. In a portable refrigerating plant, the combination with a vehicle, of a substantially cylindrical tank mounted thereon, an internal shell mounted therein to form an interior chamber and a surrounding annular chamber, two circulating coils mounted in each of said chambers, a compressor, intermediate connections between said compressor and one coil of each set, means for reversing the directing of circulation from the compressor through said last mentioned coils, and means for causing a circulation through each of the other two coils.

6. In a portable refrigerating plant, the combination with a vehicle, of a substantially cylindrical tank mounted thereon, an internal shell mounted therein to form an interior chamber and a surrounding annular chamber, a circulating coil extending through the interior chamber, a circulating coil extending through said coil, a circulating coil extending through the annular chamber, a circulating coil extending through said last mentioned coil, a compressor, intermediate connections between said compressor and one coil of each set, and means for causing a circulation through each of the other two coils.

7. In a portable refrigerating plant, the combination with a vehicle, of a substantially cylindrical tank mounted thereon, an internal shell mounted therein to form an interior chamber and a surrounding annular chamber, a circulating coil extending through the interior chamber, a circulating coil extending through said coil, a circulating coil extending through the annular chamber, a circulating coil extending through said last mentioned coil, a compressor, intermediate connections between said compressor and one coil of each set, means for reversing the directing of circulation from the compressor through said last mentioned coils, and means for causing a circulation through each of the other two coils.

8. In a portable refrigerating plant, the combination with a vehicle, of a substantially cylindrical tank mounted thereon, an internal shell mounted therein and consisting in part of heat-insulating material to form an interior chamber and a surrounding annular chamber, two circulating coils mounted in each of said chambers, a compressor, intermediate connections between said compressor and one coil of each set, and means for causing a circulation through each of the other two coils.

9. In a portable refrigerating plant, the combination with a vehicle, of a substantially cylindrical tank mounted thereon, an internal shell mounted therein and consisting in part of heat-insulating material to form an interior chamber and a surrounding annular chamber, two circulating coils mounted in each of said chambers, a compressor, intermediate connections between said compressor and one coil of each set, means for reversing the directing of circulation from the compressor through said last mentioned coils, and means for causing a circulation through each of the other two coils.

10. In a portable refrigerating plant, the combination with a vehicle, of a substantially cylindrical tank mounted thereon, an internal shell mounted therein and consisting in part of heat-insulating material to form an interior and a surrounding annular chamber, a circulating coil extending through the interior chamber, a circulating coil extending through said coil, a circulating coil extending through the annular chamber, a circulating coil extending through the said last mentioned coil, a compressor, intermediate connections between said compressor and one coil of each set, and means for causing a circulation through each of the other two coils.

11. In a portable refrigerating plant, the combination with a vehicle, of a substantially cylindrical tank mounted thereon, an internal shell mounted therein and consisting in part of heat-insulating material to form an interior chamber and a surrounding annular chamber, a circulating coil extending through the interior chamber, a circulating coil extending through said coil, a circulating coil extending through the annular chamber, a circulating coil extending through said last mentioned coil, a compressor, intermediate connections between said compressor and one coil of each set, means for reversing the directing of circulation from the compressor through said last mentioned coils, and means for causing a circulation through each of the other two coils.

12. In a portable refrigerating plant, the combination with a vehicle of a substantially cylindrical horizontal tank, an internal horizontal shell mounted therein to form an interior chamber and a surrounding annular chamber, a circulating coil extending through the interior chamber, a circulating coil extending through said coil and connected to the interior of the shell, a circulating coil extending through the annular chamber, a circulating coil extending through said last mentioned coil, protecting pipes extended through the annular chamber and each surrounding a composite member of the composite circulating coil which extends through said annular chamber, and means for circulating fluids through said coils.

13. In a portable refrigerating plant, the combination with a vehicle of a substantially cylindrical horizontal tank mounted thereon, an internal horizontal shell mounted therein and consisting in part of heat-insulating material to form an interior chamber and a surrounding annular chamber, a circulating coil extending through the interior chamber, a circulating coil extending through said coil and connected to the interior of the shell, a circulating coil extending through the annular chamber, a circulating coil extending through said last mentioned coil, protecting pipes extended through the annular chamber and each surrounding a composite member of the composite circulating coil which extends through said annular chamber, and means for circulating fluids through said coils.

In witness whereof, I have hereunto set my hand and seal at Indianapolis, Indiana, this 27th day of October, A. D. one thousand nine hundred and six.

SAMUEL H. BRUBAKER. [L. S.]

Witnesses:
ARTHUR M. HOOD,
J. V. DITTEMORE.